(12) United States Patent
Anabuki et al.

(10) Patent No.: US 9,224,037 B2
(45) Date of Patent: Dec. 29, 2015

(54) APPARATUS AND METHOD FOR CONTROLLING PRESENTATION OF INFORMATION TOWARD HUMAN OBJECT

(71) Applicant: CANON KABUSHIKI KAISHA, Tokyo (JP)

(72) Inventors: Mahoro Anabuki, Yokohama (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 451 days.

(21) Appl. No.: 13/687,894

(22) Filed: Nov. 28, 2012

(65) Prior Publication Data

US 2013/0136304 A1    May 30, 2013

(30) Foreign Application Priority Data

Nov. 30, 2011 (JP) .................................. 2011-262533

(51) Int. Cl.
*G06K 9/00* (2006.01)
(52) U.S. Cl.
CPC ........ *G06K 9/00362* (2013.01); *G06K 9/00308* (2013.01); *G06K 9/00335* (2013.01); *G06K 9/00671* (2013.01)
(58) Field of Classification Search
None
See application file for complete search history.

(56) References Cited

U.S. PATENT DOCUMENTS

| | | | | |
|---|---|---|---|---|
| 6,009,410 A | * | 12/1999 | LeMole et al. | 705/14.54 |
| 7,174,029 B2 | * | 2/2007 | Agostinelli et al. | 382/100 |
| 8,126,774 B2 | * | 2/2012 | Hendrickson et al. | 705/14.49 |
| 2002/0184098 A1 | * | 12/2002 | Giraud et al. | 705/14 |
| 2003/0165270 A1 | * | 9/2003 | Endrikhovski et al. | 382/189 |

(Continued)

FOREIGN PATENT DOCUMENTS

| | | |
|---|---|---|
| JP | 2002-229918 A | 8/2002 |
| JP | 3565288 B2 | 9/2004 |

(Continued)

OTHER PUBLICATIONS

Philip DeCamp, "HeadLock: Wide-Range Head Pose Estimation for Low Resolution Video", Master of Science in Media Arts and Sciences Thesis, Massachusetts Institute of Technology, Oct. 5, 2007, pp. 1-87.

*Primary Examiner* — Gandhi Thirugnanam
(74) *Attorney, Agent, or Firm* — Canon USA Inc. IP Division

(57) ABSTRACT

A human object recognition unit recognizes a human object included in a captured image data. A degree-of-interest estimation unit estimates a degree of interest of the human object in acquiring information, based on a recognition result obtained by the human object recognition unit. An information acquisition unit acquires information as a target to be presented to the human object. An information editing unit generates information to be presented to the human object from the information acquired by the information acquisition unit, based on the degree of interest estimated by the degree-of-interest estimation unit. An information display unit outputs the information generated by the information editing unit.

14 Claims, 8 Drawing Sheets

(56) References Cited

U.S. PATENT DOCUMENTS

| | | | |
|---|---|---|---|
| 2007/0174117 A1* | 7/2007 | Hendrickson et al. | 705/14 |
| 2009/0028434 A1* | 1/2009 | Vanhoucke et al. | 382/182 |
| 2009/0192874 A1* | 7/2009 | Powles et al. | 705/10 |
| 2009/0273687 A1* | 11/2009 | Tsukizawa et al. | 348/222.1 |
| 2009/0297045 A1* | 12/2009 | Poetker et al. | 382/224 |
| 2010/0017396 A1* | 1/2010 | Chatani | 707/5 |
| 2010/0161409 A1* | 6/2010 | Ryu et al. | 705/14.43 |
| 2011/0153431 A1* | 6/2011 | Kim et al. | 705/14.66 |
| 2011/0166937 A1* | 7/2011 | Bangera et al. | 705/14.58 |
| 2011/0166940 A1* | 7/2011 | Bangera et al. | 705/14.66 |
| 2011/0176025 A1* | 7/2011 | Anabuki | 348/222.1 |
| 2011/0251903 A1* | 10/2011 | Ryu et al. | 705/14.73 |
| 2012/0086793 A1* | 4/2012 | Anabuki | 348/77 |
| 2012/0265606 A1* | 10/2012 | Patnode | 705/14.41 |
| 2012/0278179 A1* | 11/2012 | Campbell et al. | 705/14.69 |
| 2013/0121528 A1* | 5/2013 | Ikenoue et al. | 382/103 |
| 2013/0124518 A1* | 5/2013 | Ikenoue et al. | 707/736 |
| 2013/0136304 A1* | 5/2013 | Anabuki et al. | 382/103 |
| 2013/0268407 A1* | 10/2013 | Boncyk et al. | 705/26.61 |
| 2014/0092242 A1* | 4/2014 | Krishnan et al. | 348/143 |

FOREIGN PATENT DOCUMENTS

| | | | | |
|---|---|---|---|---|
| JP | 2005-309537 A | | 11/2005 | |
| JP | 2005309537 A | * | 11/2005 | G06F 3/00 |
| JP | 2006-113711 A | | 4/2006 | |
| JP | 2006-244028 A | | 9/2006 | |
| JP | 2006268630 A | * | 10/2006 | |
| JP | 2007-265125 A | | 10/2007 | |
| JP | 2007265125 A | * | 10/2007 | |
| JP | 2009-20266 A | | 1/2009 | |
| JP | 2009-277097 A | | 11/2009 | |
| JP | 2010-176510 A | | 8/2010 | |
| JP | 2010-237761 A | | 10/2010 | |
| WO | WO 2006040974 A1 | * | 4/2006 | |
| WO | WO 2007074842 A1 | * | 7/2007 | |
| WO | 2010/070882 A1 | | 6/2010 | |
| WO | 2013/057882 A1 | | 4/2013 | |

* cited by examiner

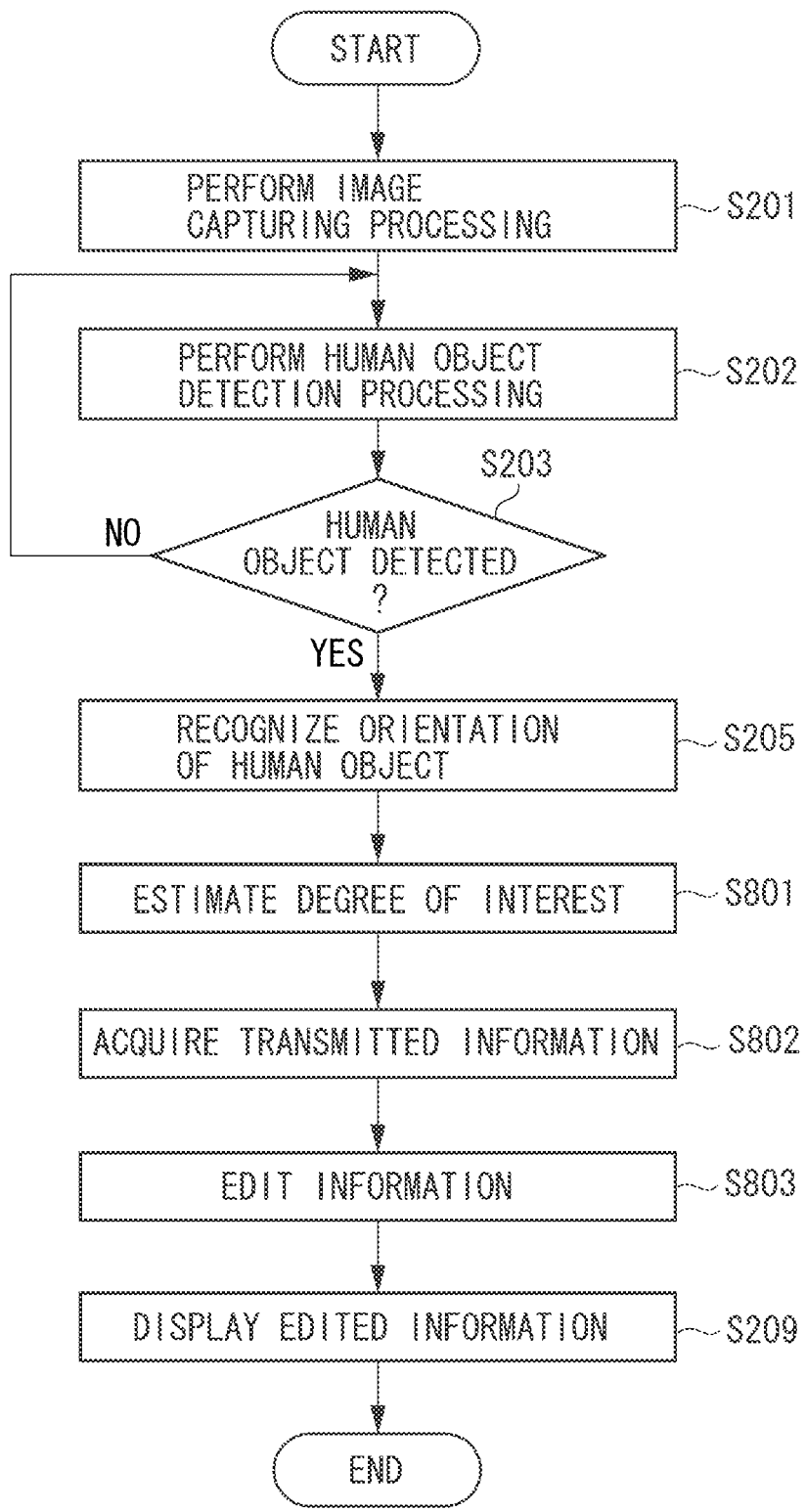

APPARATUS AND METHOD FOR CONTROLLING PRESENTATION OF INFORMATION TOWARD HUMAN OBJECT

BACKGROUND OF THE INVENTION

1. Field of the Invention

The present invention relates to a technique for controlling presentation of information toward a human object.

2. Description of the Related Art

As is generally known, there is a push-type information presentation terminal that can autonomously present information while switching an information presentation method with reference to a situation of a person who is present in the neighborhood of the terminal. For example, a technique discussed in Japanese Patent Application Laid-Open No. 2005-309537 can present information at a location according to a moving direction of a person or the speed of the movement. Japanese Patent Application Laid-Open No. 2006-113711 discusses a technique for determining data to be displayed for a person considering an appearance of a person or a locus of the movement. Japanese Patent Application Laid-Open No. 2007-265125 discusses a technique for determining a content to be displayed according to the number of persons who are watching an information display unit.

Japanese Patent Application Laid-Open No. 2009-277097 discusses a technique for controlling a display size or a sound volume of information to be output based on a distance between an information output unit and a person or based on a movement of the person. Japanese Patent Application Laid-Open No. 2010-176510 discuses a technique for selecting information to be displayed based on an action of a person who is present in front of an information display screen. When the above-described conventional techniques are employed, a push-type information presentation terminal can present information with content, location, size, and sound volume, relating to a person in the neighborhood of the terminal.

However, in a case where the amount of information presented by the information presentation terminal is excessive, even if the information is appropriate in content, presentation layout, and sound volume for a situation of a person in the neighborhood of the terminal, the person may not be able to catch the entire information or may be interrupted in acquiring information. On the contrary, in a case where the amount of information presented by the information presentation terminal is too little, even if the information is appropriate in content, location, size, and sound volume for a situation of a person in the neighborhood of the terminal, the person's desire for information may not be satisfied.

With respect to such a situation, a technique discussed in Japanese Patent No. 3565288 determines a priority level based on the time elapsed since reception of information by an information presentation terminal and a degree of interest in each genre that can be designated by an information receiver, and presents the information according to the determined priority level. When the above-described technique is employed, the amount of information to be presented can be controlled according to the feature (e.g., generation date and time and genre) of the information.

However, the criterion for determining whether to increase or decrease the amount of information to be presented is not limited to the feature of the information. For example, the length of time a person can stay in the neighborhood of the information presentation terminal can be used as a criterion for determining whether to increase or decrease the amount of information. If a person (i.e., an information receiver) can stay only for a short time in the neighborhood of the information presentation terminal, the information receiver may feel that there is a great amount of information if the receiver cannot grasp the entire information at a glance even when the genre of the information is interesting. On the contrary, if a person (i.e., an information receiver) is required to stay for a relatively long time in the neighborhood of the information presentation terminal, the information receiver may feel that there is a small amount of information if the amount of the information is insufficient even when the genre of the information is not interesting.

Similarly, how a person who receives information focuses on an activity other than acquisition of information can be used as a criterion for determining whether to increase or decrease the amount of information. Even in such a situation that interesting information is presented from an information presentation terminal, if the information receiver is busy to talk with a friend or apply make-up, the information receiver may feel that the amount of information is excessive when the information receiver cannot grasp the entire information at a glance. More specifically, the situation (e.g., the length of time or the degree of concentration in the reception of the presented information) of the information receiver is one of the factors to be considered in determining whether to increase or decrease the amount of information.

SUMMARY OF THE INVENTION

The present invention is directed to a technique for presenting information of which amount reflects a person's degree of interest in acquiring information.

According to an aspect of the present invention, an information processing apparatus includes a recognition unit configured to recognize a human object included in a captured image data, an estimation unit configured to estimate a degree of interest of the human object in acquiring information, based on a recognition result obtained by the recognition unit, an acquisition unit configured to acquire information as a target to be presented to the human object, a generation unit configured to generate information to be presented to the human object from the information acquired by the acquisition unit, based on the degree of interest estimated by the estimation unit, and a control unit configured to cause an output unit to output the information generated by the generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating processing to be performed by the presentation control apparatus according to the third exemplary embodiment.

DESCRIPTION OF THE EMBODIMENTS

Various exemplary embodiments, features, and aspects of the invention will be described in detail below with reference to the drawings.

First, an information processing apparatus according to a first exemplary embodiment of the present invention is described below. A presentation control apparatus according to the first exemplary embodiment is applicable to a push-type information presentation terminal that can be located, for example, in a living room of an individual house.

Figure 1:
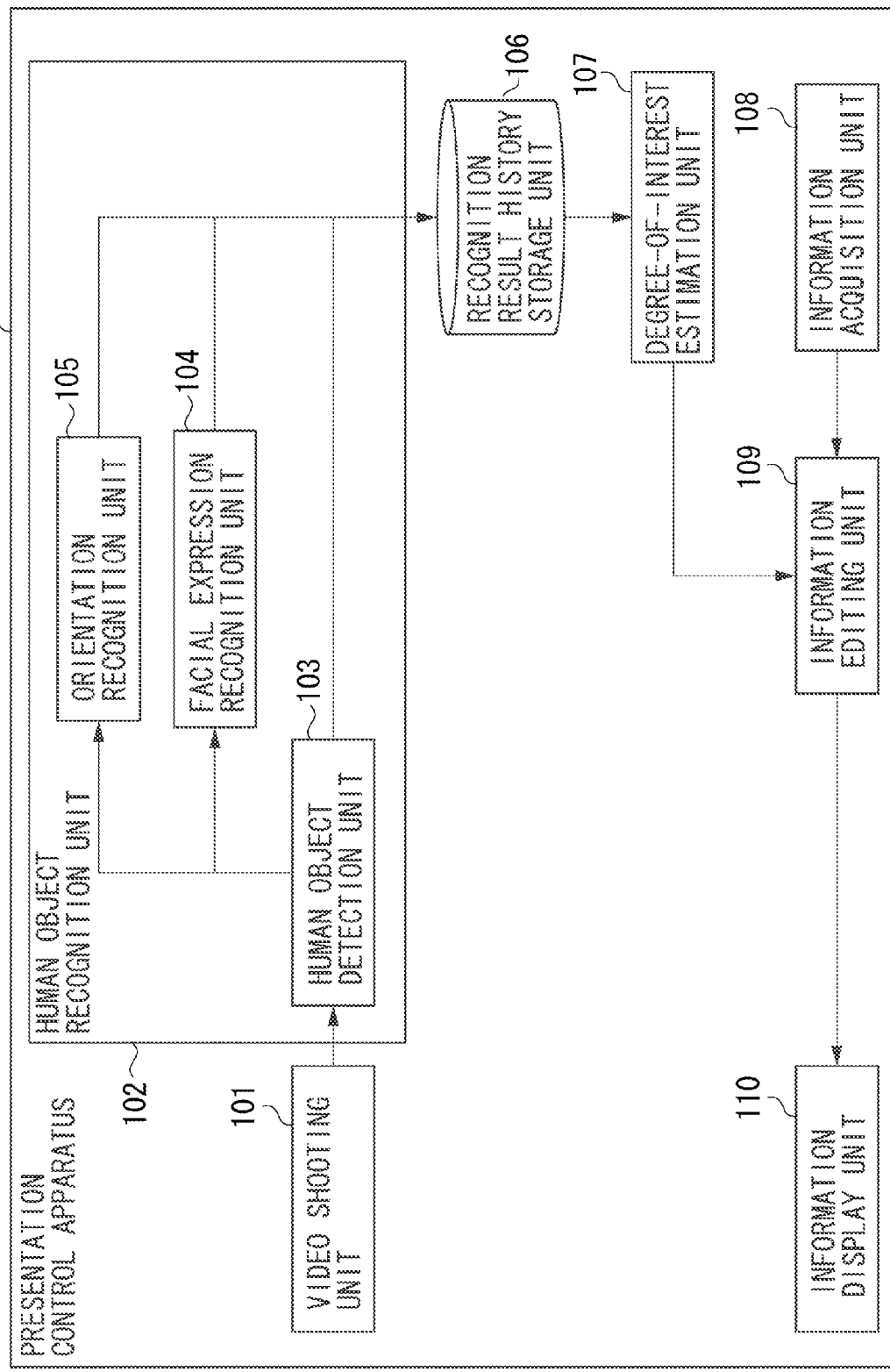
FIG. 1 illustrates an example configuration of a presentation control apparatus according to a first exemplary embodiment.

FIG. 1 illustrates an example configuration of a presentation control apparatus 100 according to the first exemplary embodiment. As illustrated in FIG. 1, the presentation control apparatus 100 according to the first exemplary embodiment includes a video shooting unit 101, a human object recognition unit 102, a recognition result history storage unit 106, a degree-of-interest estimation unit 107, an information acquisition unit 108, an information editing unit 109, and an information display unit 110. The human object recognition unit 102 includes a human object detection unit 103, a facial expression recognition unit 104, and an orientation recognition unit 105.

The video shooting unit 101 is a camera that can capture an image of a space surrounding the presentation control apparatus 100. The video shooting unit 101 may include a plurality of cameras so as to capture a wide-range image of the space surrounding the presentation control apparatus 100. Further, the video shooting unit 101 may include a fisheye lens equipped camera so as to capture a wide-range image of the space surrounding the presentation control apparatus 100 by single camera. Further, the video shooting unit 101 may include only one single camera equipped with a standard lens to capture a limited-range image of the space surrounding the presentation control apparatus 100.

As the presentation control apparatus 100 according to the first exemplary embodiment is applicable to a push-type information presentation terminal that can be located in an individual house, image data captured by the video shooting unit 101 may include a figure of a human object that comes and goes in the house. The image data captured by the video shooting unit 101 is output to the human object recognition unit 102.

The human object recognition unit 102 receives the image data from the video shooting unit 101. The human object detection unit 103, the facial expression recognition unit 104, and the orientation recognition unit 105 cooperatively recognize a human object included in the input image data. The human object recognition unit 102 outputs a recognition result together with information indicating the time when the recognition processing has been performed to the recognition result history storage unit 106.

The human object detection unit 103 receives the image data from the video shooting unit 101. Then, the human object detection unit 103 detects an area corresponding to the human object included in the input image data. For example, to realize the above-described processing, the human object detection unit 103 detects a feature deriving from the human object, such as a personal face or head, from the input image data.

The feature deriving from a human object is obtainable using, for example, histograms of oriented gradients (HOG), which can represent a feature amount histogrammed along the gradient direction in a local area. An example method for determining the feature deriving from a human object includes collecting a great amount of image data pieces including the human object and statistically learning a common feature amount included in the collected image data pieces, for example, using an algorithm that is generally referred to as "Boosting".

If the feature deriving from the human object is included in the input image data, the human object detection unit 103 recognizes that "a human object is detected in a feature detected area". Then, the human object detection unit 103 outputs image data of an area corresponding to the detected human object to the facial expression recognition unit 104 and the orientation recognition unit 105. At the same time, the human object detection unit 103 outputs information indicating the position of the area corresponding to the detected human object and the size of the area, together with information indicating the time when the human object detection processing has been performed, to the recognition result history storage unit 106.

If the facial expression recognition unit 104 receives the image data of the area corresponding to the detected human object, the facial expression recognition unit 104 recognizes a facial expression of the human object included in the image data. For example, the facial expression recognition unit 104 can preliminarily prepare a plurality of image data groups each representing a specific facial expression. Then, the facial expression recognition unit 104 checks how the facial expression of the human object included in the image data of the area corresponding to the human object resembles each of the above-described plurality of image data groups and identifies the most similar group. According to the present exemplary embodiment, the facial expression recognition unit 104 prepares a total of five types of image data groups representing "positive and intensive emotional expression (i.e., joy)", "positive and calm emotional expression (i.e., pleasure)", "negative and violent emotional expression (i.e., anger)", "negative and calm emotional expression (i.e., sorrow)", and "emotionless neutral expression".

First, the facial expression recognition unit 104 identifies an area where the feature deriving from the human object has been detected from the image data of the area corresponding to the human object. The above-described feature amount (e.g., HOG) is used in the above-described identifying processing. Next, the facial expression recognition unit 104 determines how image data that is obtained by normalizing the identified area resembles each of a plurality of image data groups prepared beforehand for the above-described five facial expressions. The facial expression recognition unit 104 generates beforehand a determination axis, for example, that can separate the image data group representing the "positive and intensive emotional expression (i.e., joy)" from the image data group representing the "emotionless neutral expression", using linear discriminant analysis (LDA). Then, the facial expression recognition unit 104 identifies the image data group that most resembles the normalized image data using the determination axis. By repeating the above-described operation in the comparison between two or more image data groups that correspond to respective facial expressions, the facial expression recognition unit 104 can recognize how a facial expression of a person included in the image data of the area corresponding to the human object resembles each of the five facial expressions prepared beforehand.

Further, the facial expression recognition unit 104 may recognize a feature that reveals person's feelings from the image data of the area corresponding to the human object. For example, it is generally known that a change in the size of a pupil or the number of blinks reveals feelings of a person. Accordingly, the facial expression recognition unit 104 recognizes the size of a pupil or the size of an eye (i.e., opening degree) so that the degree-of-interest estimation unit 107 can measure a change in the size of a pupil or the number of blinks. In the recognition processing, the facial expression recognition unit 104 identifies an area, in which a feature deriving from a human face can be detected, in the image data of the area corresponding to the human object.

Subsequently, the facial expression recognition unit 104 identifies an eye area from the identified area using pattern matching. Then, the facial expression recognition unit 104 performs pupil pattern detection processing or eye contour extraction processing on the identified eye area. Then, finally, the facial expression recognition unit 104 generates information indicating the size of the pupil or the shape (e.g., opened or closed shape) of the eye contour, as a recognition result obtained from the image data of the area corresponding to the human object. The facial expression recognition unit 104 outputs the recognition result together with information indicating the time when the recognition processing has been performed to the recognition result history storage unit 106.

If the orientation recognition unit 105 receives the image data of the area corresponding to the human object, the orientation recognition unit 105 recognizes an orientation of the human object included in the image data. According to the present exemplary embodiment, the term "orientation" represents a "relative position and orientation relationship between body parts constituting a human body" or "position and orientation of each body part with respect to the video shooting unit 101". In the above-described recognition processing, the orientation recognition unit 105 searches for a feature deriving from a preliminarily prepared body part that constitutes the human body, which is included in the image data of the area corresponding to the human object. For example, the body parts include a face, a head, hands, arms, legs, knees, shoulders, a waist, a chest, a navel, and a back. The feature of each body part is variable depending on an image capturing direction. For example, in a case where a target body part is a face, a plurality of features to be searched is prepared, such as a front face part, a profile part, and a downward face part, which are dependent of the direction. Through the above-described search, the orientation recognition unit 105 can obtain the position and orientation (e.g., information indicating a rotational state in the image data) in the area of each body part included in the image data.

The obtained position and orientation of each body part can be expressed as the position and orientation of each body part in the image data on the basis of a position of a reference body part (e.g., a head) in a case where the orientation is the "relative position and orientation relationship between body parts constituting a human body". For example, if "a right shoulder is placed in distance from a head by (X,Y) pixels and inclined at θ degrees with respect to the X-axis in a video area", coordinate values (X, Y, θ) express the position and orientation of the right shoulder.

In a case where the orientation is the "position and orientation of each body part with respect to the video shooting unit 101", the "position and orientation of each body part with respect to the video shooting unit 101" can be calculated based on the obtained position and orientation of each body part and the size of each body part included in the image data.

For example, when the orientation recognition unit 105 calculates the "position and orientation of a head with respect to the video shooting unit 101", the orientation recognition unit 105 determines a standing position of a human object included in image data captured by the video shooting unit 101 from an area where the human object detection unit 103 has detected a feature deriving from a person's foot. According to the present exemplary embodiment, if the height of the video shooting unit 101 from the ground is already known, the orientation recognition unit 105 can obtain a positional relationship between the video shooting unit 101 and a human object with reference to its standing position in the captured image data.

In addition, according to the present exemplary embodiment, it is presumed that a human object included in image data captured by the video shooting unit 101 stands upright (namely, the head is positioned just above legs of the human object). In this case, the orientation recognition unit 105 can determine the position of the head with respect to the video shooting unit 101 with reference to the positional relationship between the video shooting unit 101 and the human object as well as the head position of the human object included in the image data captured by the video shooting unit 101. The validity of the premise that the human object stands upright may be evaluated based on a positional relationship between body parts. As an evaluation result, if it is determined the orientation is not upright (e.g., side flexion), the orientation recognition unit 105 can obtain a positional relationship between the video shooting unit 101 and the head of the human object considering the evaluation result.

Next, an orientation of a head may be determined using, for example, a method discussed in Philip DeCamp. (2007) HeadLock: Wide-Range Head Pose Estimation for Low Resolution Video. M.Sc. in Media Arts and Sciences Thesis. More specifically, the orientation recognition unit 105 generates image data captured by a virtual camera while changing the orientation of a general three-dimensional virtual head model with respect to the virtual camera. The orientation recognition unit 105 compares the generated image data of the virtual head with image data of the head of the human object in the image data captured by the video shooting unit 101. Then, the orientation recognition unit 105 changes the orientation of the virtual head model with respect to the virtual camera so that the compared image data pieces become substantially identical to each other using a certain criterion. In this case, the orientation of the virtual head model with respect to the virtual camera at the time when the compared image data pieces are finally equalized with each other is recognized as the orientation of the head of the human object with respect to the video shooting unit 101.

The orientation recognition unit 105 outputs a recognition result obtained through the above-described processing, together with information indicating the time when the recognition processing has been performed, to the recognition result history storage unit 106.

The human object recognition unit 102 may include any other constituent components in addition to the human object detection unit 103, the facial expression recognition unit 104, and the orientation recognition unit 105. For example, the human object recognition unit 102 may include a behavior recognition unit that can recognize a behavior of a human object included in image data captured by the video shooting unit 101. In this case, the behavior recognition unit outputs a recognition result together with information indicating the time when the recognition processing has been performed to the recognition result history storage unit 106.

The recognition result history storage unit 106 stores a human object recognition result received from the human object recognition unit 102 (including the detection result received from the human object detection unit 103, the recognition result received from the facial expression recognition unit 104, and the recognition result received from the orientation recognition unit 105), together with information indicating the time when the detection or recognition processing has been performed. The human object recognition result stored in the recognition result history storage unit 106 can be referred to by the degree-of-interest estimation unit 107 as described below.

The degree-of-interest estimation unit 107 estimates a degree of interest that indicates how a person (i.e., the human object) included in the image data captured by the video shooting unit 101 is interested in acquiring information considering a situation of the human object, with reference to the human object recognition result received from the human object recognition unit 102 and stored in the recognition result history storage unit 106. The degree-of-interest estimation unit 107 estimates a degree of interest at time "t", according to a result of the human object recognition processing performed at time "t" or a variation of the result of the human object recognition processing performed between time "t-$t_0$" and time "t".

First, an example estimation of the degree of interest at time "t" based on the result of the human object recognition processing performed at time "t" is described below. In this case, the degree-of-interest estimation unit 107 inputs a value of a human object recognition result obtained by the human object recognition unit 102 at time "t" into an evaluation function which is set beforehand, and obtains an output value from the evaluation function as an estimation result of the degree of interest at time "t".

For one example of the evaluation function to be used, the evaluation function outputs an estimation value indicating a higher degree of interest as a position of an area where a human object is detected (i.e., a detection result of the human object detection unit 103) is closer to the center of the image data captured by the video shooting unit 101. As another example, the evaluation function outputs an estimation value indicating a higher degree of interest as the area where the human object is detected (i.e., the detection result of the human object detection unit 103) has a larger size. When using the above-described evaluation functions, the degree-of-interest estimation unit 107 may output an estimation value indicating a higher degree of interest as a position of a person is closer to the presentation control apparatus 100. More specifically, the degree-of-interest estimation unit 107 estimates a person's degree of interest toward presented information under the assumption that "the situation that a person is positioned in the neighborhood of a push-type information presentation terminal indicates that the person is highly interested in the presented information".

Further, as another example, the evaluation function may output an estimation value indicating a higher degree of interest if the facial expression recognition unit 104 generates a positive and moderate output. According to this example, if a person is present in the neighborhood of the presentation control apparatus 100 with a relaxed facial expression (e.g., a positive and calm emotional expression), the evaluation function estimates that the person's degree of interest is high.

More specifically, the degree-of-interest estimation unit 107 estimates a person's degree of interest toward presented information under the assumption that "the situation that a person has a relaxed facial expression indicates that the person is highly interested in the presented information".

Further, as another example, in a case where the orientation recognition unit 105 outputs a positional relationship between body parts, the evaluation function may output an estimation value indicating a higher degree of interest if it is determined that two shoulders or two hands are well balanced in the distance from a reference head in the right and left direction based on the output of the orientation recognition unit 105. According to this example, if a person is present in the neighborhood of the presentation control apparatus 100 while facing the video shooting unit 101 squarely, the evaluation function estimates that the person's degree of interest is high. More specifically, the degree-of-interest estimation unit 107 estimates a person's degree of interest toward presented information under the assumption that "the situation that a person squarely faces a push-type information presentation terminal indicates that the person is highly interested in the presented information".

However, if the degree of interest is estimated by simply checking "the balance of two shoulders or two hands relative to a reference head in the right and left direction," a case in which a person stands with his/her back to the video shooting unit 101 may be wrongly estimated that the person's degree of interest is high. To handle such a case, if there is not any person's "face" recognition result stored as the human object recognition result at time "t" in the recognition result history storage unit 106, the degree-of-interest estimation unit 107 can determine that the person is not facing the video shooting unit 101 and may output an estimation value indicating a lower degree of interest. Further, if the "face" recognition result stored in the recognition result history storage unit 106 is a "profile" or a "downward face" of a person, the degree-of-interest estimation unit 107 can determine that the person's line of sight is not directed to an information presentation terminal including the video shooting unit 101 and may output an estimation value indicating a lower degree of interest.

In a case where the orientation recognition unit 105 outputs the position and orientation of each body part with respect to the video shooting unit 101, similar processing can be performed. More specifically, the degree-of-interest estimation unit 107 outputs an estimation value indicating a higher degree of interest if it is determined that a person squarely faces a push-type information presentation terminal to which the presentation control apparatus 100 can be applied, based on a positional relationship between the video shooting unit 101 and each body part. In particular, evaluating the direction of a head facing the video shooting unit 101 is useful to determine how each person's line of sight is directed to the video shooting unit 101. Therefore, the degree of interest may be estimated by taking each person's line of sight into consideration.

Next, an example estimation of the degree of interest at time "t" based on the result of the human object recognition processing performed between time "t-$t_0$" and time "t" is described below. In this case, the degree-of-interest estimation unit 107 inputs a change speed or history of the human object recognition result obtained by the human object recognition unit 102 between time "t-$t_0$" and time "t" into an evaluation function set beforehand, and obtains an output value from the evaluation function as an estimation result of the degree of interest of at the time "t".

For example, the evaluation function outputs an estimation value indicating a higher degree of interest as a position of an area where a human object is detected by the human object detection unit 103 is moving at a lower speed. As another example, the evaluation function outputs an estimation value indicating a higher degree of interest as the size of the area where the human object is detected by the human object detection unit 103 changes at a lower speed. By using the above-described evaluation functions, the degree-of-interest estimation unit 107 may output an estimation value indicating a higher degree of interest as a person is slowly approaching to or slowly leaving from the presentation control apparatus 100. The situation that a person is slowly approaching to or slowly leaving from a push-type information presentation terminal is the situation that the person can stay long in the neighborhood of the information presentation terminal. More specifically, the degree-of-interest estimation unit 107 estimates a person's degree of interest toward presented information under the assumption that "the situation that a person can stay long in the neighborhood of a push-type information presentation terminal indicates that the person is highly interested in the presented information".

Further, as another example, the evaluation function can output an estimation value indicating a higher degree of interest as the change speed of the output of the facial expression recognition unit 104 is larger. In this case, if a facial expression of a person who is present in the neighborhood of the presentation control apparatus 100 changes largely, the evaluation function estimates that the degree of interest is high. The situation that there is any change in a person's facial expression that reveals internal feelings is the situation that the person is responding to a certain stimulation. More specifically, the degree-of-interest estimation unit 107 estimates a person's degree of interest toward presented information under the assumption that "the situation that a person is responding to a certain stimulation in the neighborhood of a push-type information presentation terminal indicates that the person is highly interested in the presented information".

Further, as another example, the evaluation function can output an estimation value of the degree of interest with reference to a change history of the pupil size and the eye size (i.e., opening degree), which is an output of the facial expression recognition unit 104, between time "t-$t_0$" and time "t". It is generally known that the pupil opens largely when a person awakes and the number of blinks decreases when a person is cautious or in a concentrated state. Therefore, the evaluation function may outputs an estimation value indicating a higher degree of interest when the size of a pupil becomes larger or the number of blinks decreases between time "t-$t_0$" and time "t". More specifically, the degree-of-interest estimation unit 107 estimates a person's degree of interest toward presented information under the assumption that "the situation that a person largely opens the pupil or the number of blinks decreases indicates that the person is highly interested in the presented information".

Further, as another example, the evaluation function outputs an estimation value indicating a higher degree of interest as the positional relationship between body parts (i.e., the output of the orientation recognition unit 105) changes at a lower speed. In this case, if the orientation of a person who is present in the neighborhood of the presentation control apparatus 100 changes slowly, more specifically, when the action of the person is slow, the degree-of-interest estimation unit 107 may estimate that the person's degree of interest is high. The situation that a person acts slowly in the neighborhood of a push-type information presentation terminal is the situation that the person has enough time available to do something.

Accordingly, the degree-of-interest estimation unit 107 estimates a person's degree of interest toward presented information under the assumption that "the situation that a person has enough time available to do something in the neighborhood of a push-type information presentation terminal indicates that the person is highly interested in the presented information". In other words, the situation that a person moves quickly in the neighborhood of a push-type information presentation terminal is the situation that the person's behavior is not related to information acquisition. Therefore, the degree-of-interest estimation unit 107 estimates a person's degree of interest toward presented information under the assumption that "the situation that a person is performing a behavior not related to information acquisition in the neighborhood of a push-type information presentation terminal indicates that the person is not interested in the presented information".

Further, as another example, the evaluation function can output an estimation value of the degree of interest with reference to a change history of a "position and orientation of a head part with respect to the video shooting unit 101" (i.e., the output of the orientation recognition unit 105) between time "t-$t_0$" and time "t". This is based on the premise that the "position and orientation of the head part with respect to the information display unit 110" can be calculated based on the "position and orientation of the head part with respect to the video shooting unit 101" in a case where the positional relationship between the video shooting unit 101 and the information display unit 110 is fixed and measurable beforehand. If the "position and orientation of the head part with respect to the information display unit 110" can be calculated, the frequency or time of a person's line-of-sight directed to the information presentation position can be measured based on a calculation result. Therefore, the evaluation function may output an estimation value indicating a higher degree of interest when the frequency or time value is large. More specifically, the degree-of-interest estimation unit 107 estimates a person's degree of interest toward presented information under the assumption that "the situation that a person's line of sight is directed to a push-type information presentation terminal frequently or for a long time indicates that the person is highly interested in the presented information".

The contents of the above-described evaluation function may be variable depending on time "t". More specifically, the evaluation function can output an estimation value that is variable depending on the time zone (e.g., morning or afternoon) of the time "t" when the evaluation function is used even in a case where the same human object recognition result is obtained. Further, the evaluation function may output an estimation value that is variable depending on not only time but also date or day of week.

As described above, there is a plurality of methods for estimating a person's degree of interest in acquiring information. In addition, a person's degree of interest may be totally estimated based on a combination of a plurality of estimation results.

The degree-of-interest estimation unit 107 estimates a degree of interest that indicates how the human object included in the image data captured by the video shooting unit 101 is interested in acquiring information, using the above-described evaluation function with reference to the human object recognition result received from the human object recognition unit 102 and stored in the recognition result history storage unit 106. The degree-of-interest estimation unit 107 outputs an estimation result to the information editing unit 109.

The information acquisition unit 108 acquires information transmitted from the push-type information presentation terminal to which the presentation control apparatus 100 can be applied. More specifically, the information acquisition unit 108 acquires weather forecast information or news information at that time via a network. In this case, the information acquisition unit 108 acquires not only a text or a video that explains the acquired weather forecast or the news content but also structure information of the acquired information. According to the present exemplary embodiment, the structure information indicates a detailed structure, e.g., "heading line", "main text", "summary", "caption", "drawing", "photograph", and "representative photograph" of the text or the video that constitutes the information.

If the information acquisition unit 108 obtains the structure information, the information acquisition unit 108 assigns a priority level to be presented as information considering details and importance of each information. The order of priority determined by the information acquisition unit 108 is, for example, "heading line">"summary">"photograph"+"caption">"main text">"drawing". The information acquisition unit 108 outputs the structure information including the assigned priority level, together with the text or the video that constitutes the information, to the information editing unit 109. For example, if the acquired information includes only detailed information, such as "main text", the information acquisition unit 108 can generate simplified "main text" information. Further for example, the information acquisition unit 108 can generate a "summary" that is constituted by the first line of each paragraph collected from the "main text" information or can generate a "heading line" based on the first line of each paragraph.

The information editing unit 109 edits the information input from the information acquisition unit 108 according to the degree of interest input from the degree-of-interest estimation unit 107. To this end, first, if the degree of interest is low, the information editing unit 109 selects only information that has a higher value in the "priority level to be presented as information" set by the information acquisition unit 108, as information to be presented. In this case, if the degree of interest is 1 (i.e., lowest) in the estimation using five levels, the information editing unit 109 selects only the first priority level information, e.g., information corresponding to the "heading line", as information to be presented. Similarly, if the degree of interest is 2, the information editing unit 109 selects only the first and second priority level information, e.g., information corresponding to the "heading line" and the "summary", as information to be presented. Further, if the degree of interest is 5 (i.e., highest), the information editing unit 109 selects the all information pieces as information to be presented.

The information editing unit 109 selects information to be presented to a person who is present in the neighborhood of the push-type information presentation terminal to which the presentation control apparatus 100 can be applied according to the degree of interest received from the degree-of-interest estimation unit 107, and the information editing unit 109 performs display layout processing for the selected information. Then, the information editing unit 109 outputs the display layout information to the information display unit 110.

For example, the information display unit 110 can be constituted by a speaker equipped display device or a comparable projector. The information display unit 110 displays information output from the information editing unit 109. The information display unit 110 can present information to a person who is present in the neighborhood of the push-type information presentation terminal to which the presentation control apparatus 100 can be applied.

As described above, the presentation control apparatus 100 according to the first exemplary embodiment can estimate a degree of interest of a person who is present in the neighborhood of the push-type information presentation terminal with reference to a situation of the person and can realize information presentation of which amount reflects the estimated degree of interest.

As described above, the presentation control apparatus 100 according to the first exemplary embodiment is applicable to a push-type information presentation terminal that is located, for example, in a living room of an individual house. Therefore, the presentation control apparatus 100 can present information to a person who moves in the individual house in such a way that the amount of the presented information reflects a person's degree of interest toward presented information, which can be estimated from the situation of the person.

For example, if a person who comes and goes busily in the neighborhood of the information presentation terminal while taking a time for dressing in the morning, the human object recognition unit 102 recognizes situations, such as "the moving speed of the person is high", "the person does not squarely face the information presentation terminal so often", "the person has a normal facial expression", and "the orientation of the person (including the motion of hands and legs) changes quickly". In this case, the degree-of-interest estimation unit 107 estimates that the person's degree of interest toward the presented information is low. Therefore, the information editing unit 109 selects only higher priority level information (e.g., only "heading line") and the information display unit 110 presents the selected information. When the information to be presented is limited to a small amount, like the "heading line" only, the person who is busy for dressing in the morning can easily perceive the information.

Further, for example, if a person who takes a rest in a living room while slowly relaxing after coming home in the night, the human object recognition unit 102 recognizes situations, such as "the moving speed of the person is low", "the person relatively faces the information presentation terminal", "the person has a relaxed facial expression", and "the orientation of the person does not change so much". In this case, the degree-of-interest estimation unit 107 estimates that the person's degree of interest toward the presented information is high. Therefore, the information editing unit 109 selects not only higher priority level information but also lower priority level information (e.g., "heading line", "main text", and "drawing" as complementary information). Then, the information display unit 110 presents the selected information.

Next, example processing that can be performed by the presentation control apparatus 100 according to the first exemplary embodiment is described below with reference to a flowchart illustrated in FIG. 2.

In step S201, the video shooting unit 101 captures an image of a space surrounding the presentation control apparatus 100. The video shooting unit 101 outputs the captured image data to the human object detection unit 103 provided in the human object recognition unit 102.

In step S202, the human object detection unit 103 detects a human object from the image data captured by the video shooting unit 101. More specifically, the human object detection unit 103 detects a feature deriving from a human object, such as a personal face or head, from the image data captured by the video shooting unit 101. If it is determined that the feature deriving from the human object is included in the captured image data, the human object detection unit 103 recognizes that "a human object has been detected in a feature detected area". The human object detection unit 103 outputs image data of an area corresponding to the detected human object to the facial expression recognition unit 104 and the orientation recognition unit 105. At the same time, the human object detection unit 103 outputs information indicating the position of the area corresponding to the detected human object and the size of the area, together with information indicating the time when the human object detection processing has been performed, to the recognition result history storage unit 106.

In step S203, the human object detection unit 103 determines whether a human object is detected from the image data captured by the video shooting unit 101. If it is determined that a human object is detected (YES in step S203), the operation proceeds to step S204. On the other hand, if it is determined that no human object is detected (NO in step S203), the operation returns to step S202.

In step S204, if the facial expression recognition unit 104 receives the image data of the area corresponding to the human object, the facial expression recognition unit 104 recognizes a facial expression of the human object included in the image data. First, in the recognition processing, the facial expression recognition unit 104 identifies an area where the feature deriving from the face of the human object is detected from the image data of the area corresponding to the human object. Next, the facial expression recognition unit 104 determines how image data obtained by normalizing the identified area resembles each of a plurality of image data groups prepared beforehand for five expressions. Further, the facial expression recognition unit 104 performs pupil pattern detection processing and eye contour extraction processing on the identified area to generate information indicating the size of the pupil or the shape (opened shape or closed shape) of the eye contour area. The facial expression recognition unit 104 outputs the recognition result together with information indicating the time when the recognition processing has been performed to the recognition result history storage unit 106.

In step S205, if the orientation recognition unit 105 receives the image data of the area corresponding to the human object, the orientation recognition unit 105 recognizes an orientation of the human object included in the image data. First, in the recognition processing, the orientation recognition unit 105 searches for a feature deriving from a body part of a human body that have been prepared beforehand, in the image data of the area corresponding to the human object. Thus, the position and orientation (e.g., information indicating a rotational state in the video) of the body part in the image data can be obtained. In a case where the orientation represents the "relative position and orientation relationship between body parts constituting a human body", the obtained position and orientation of each body part is expressed as the position and orientation of each body part in the image data on the basis of a position of a reference body part (e.g., a head). In a case where the orientation represents the "position and orientation of each body part with respect to the video shooting unit 101", the orientation recognition unit 105 calculates the "position and orientation of each body part with respect to the video shooting unit 101" based on the obtained position and orientation of each body part and the size of each body part. The orientation recognition unit 105 outputs a recognition result obtained in this manner, together with information indicating the time when the recognition processing has been performed, to the recognition result history storage unit 106.

According to the present exemplary embodiment, the processing in step S205 is executed after completing the processing in step S204. The processing in step S204 may be executed after completing the processing in step S205. Alternatively, the processing in step S204 and step S205 may be simultaneously executed.

In step S206, the degree-of-interest estimation unit 107 estimates a degree of interest that indicates how the human object included in the image data captured by the video shooting unit 101 is interested in acquiring information with reference to the human object recognition result received from the human object recognition unit 102 and stored in the recognition result history storage unit 106. More specifically, the degree-of-interest estimation unit 107 estimates a degree of interest at time "t" based on a result of the human object recognition processing at time "t" or based on a variation or history of the result of the human object recognition processing performed between time "t-$t_0$" and time "t". The degree-of-interest estimation unit 107 outputs an obtained estimation result to the information editing unit 109.

In step S207, the information acquisition unit 108 acquires information transmitted from the push-type information presentation terminal to which the presentation control apparatus 100 can be applied. For example, the information acquisition unit 108 acquires weather forecast information or news information via a network. At that time, the information acquisition unit 108 acquires not only a text or a video of the weather forecast or news content but also structure information of the information. The information acquisition unit 108 outputs the acquired information to the information editing unit 109.

In step S208, the information editing unit 109 edits the information input from the information acquisition unit 108 according to the degree of interest input from the degree-of-interest estimation unit 107. The editing in the present exemplary embodiment is to make a choice of the information input from the information acquisition unit 108. Then, the information editing unit 109 lays out the edited information and outputs the laid out information to the information display unit 110.

In step S209, the information display unit 110 displays the information input from the information editing unit 109, for example, on a speaker equipped display device or a comparable projector. Thus, the information can be presented to a person who is present in the neighborhood of the push-type information presentation terminal to which the presentation control apparatus 100 can be applied.

Through the above-described processing, the presentation control apparatus 100 can present information to a person who is present in the neighborhood of the push-type information presentation terminal in such a manner that the amount of information to be presented reflects a person's degree of interest in acquiring information that can be estimated from a situation of the person.

The presentation control apparatus according to the present exemplary embodiment is described as being applicable to a push-type information presentation terminal located in an individual house. However, the presentation control apparatus according to the present exemplary embodiment may be applied to a push-type information presentation terminal located in a public space (e.g., a shopping mall). In this case, the push-type information presentation terminal presents information to be presented to a person who comes and goes in the shopping mall, such as advertisement information relating to a shop in the shopping mall.

For example, when the presentation control apparatus 100 according to the first exemplary embodiment is applied to an information presentation terminal, if a person who passes by the information presentation terminal is in such a situation that "the moving speed of the person is high" or "the person does not squarely face the information presentation terminal so often", the presentation control apparatus 100 estimates that the person's degree of interest toward presented information is low and thus presents simple advertisement information. On the contrary, if a person who passes by the information presentation terminal is in such a situation that "the moving speed of the person is low" or "the person relatively faces the information presentation terminal squarely", the presentation control apparatus 100 estimates that the person's degree of interest toward presented information is high and thus presents detailed advertisement information. Accordingly, the presentation control apparatus 100 can present an appropriate level of detailed advertisement to each person with reference to the person's behavior.

Next, an information processing apparatus according to a second exemplary embodiment of the present invention is described below. A presentation control apparatus according to the second exemplary embodiment is applicable to a push-type information presentation terminal that can be located, for example, in a living room of an individual house.

Figure 3:
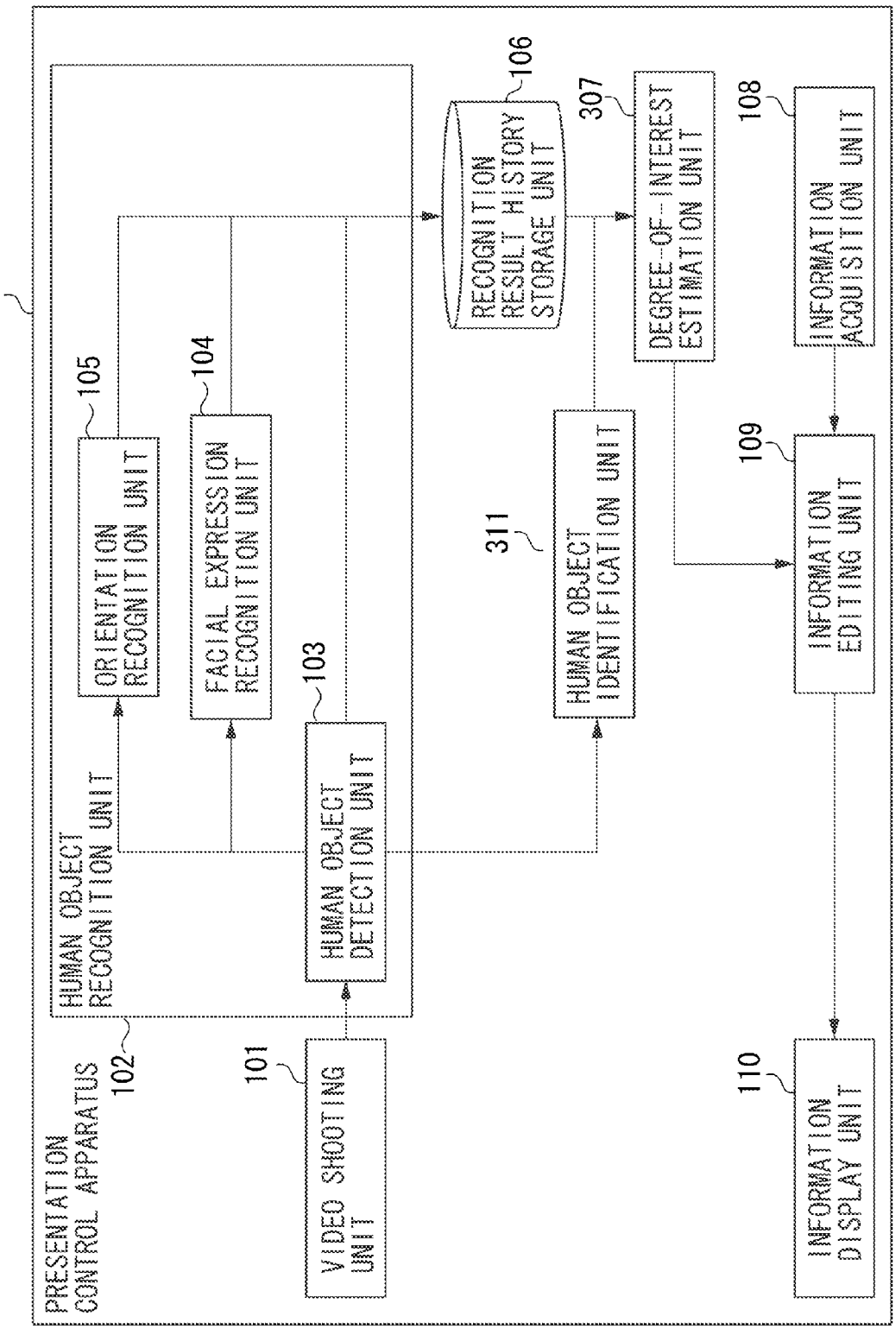
FIG. 3 illustrates an example configuration of a presentation control apparatus according to a second exemplary embodiment.

FIG. 3 illustrates an example configuration of a presentation control apparatus 300 according to the second exemplary embodiment. In FIG. 3, constituent components similar to those of the presentation control apparatus 100 described in the first exemplary embodiment with reference to FIG. 1 are denoted by the same reference numerals and the descriptions thereof may not be repeated.

The human object detection unit 103 receives image data from the video shooting unit 101. Then, the human object detection unit 103 detects an area corresponding to a human object included in the input image data. The human object detected by the human object detection unit 103 is not limited to only one. If a plurality of human objects is detected from the captured image data, the human object detection unit 103 generates a detection result (image data of the area corresponding to the human object) for each of the detected human objects. The human object detection unit 103 outputs the detection result of each detected human object to each of the facial expression recognition unit 104, the orientation recognition unit 105, and a human object identification unit 311. At the same time, the human object detection unit 103 outputs information indicating a position and a size of the area corresponding to the human object, together with information indicating the time when the human object detection processing has been performed, to the recognition result history storage unit 106 and the human object identification unit 311.

If the facial expression recognition unit 104 receives the image data of the area corresponding to the human object, the facial expression recognition unit 104 recognizes a facial expression of the human object included in the image data. If the human object detection unit 103 outputs image data of a plurality of areas corresponding to a plurality of human objects, the facial expression recognition unit 104 recognizes a facial expression of the human object included in each image data and outputs each recognition result to the recognition result history storage unit 106.

When the orientation recognition unit 105 receives the image data of the area corresponding to the human object, the orientation recognition unit 105 recognizes an orientation of the human object included in the received image data. If the human object detection unit 103 outputs image data of a plurality of areas corresponding to a plurality of human objects, the orientation recognition unit 105 recognizes an orientation of the human object included in each image data and outputs each recognition result to the recognition result history storage unit 106.

The human object recognition unit 102 may include any other constituent components in addition to the human object detection unit 103, the facial expression recognition unit 104, and the orientation recognition unit 105. For example, the human object recognition unit 102 may include a behavior recognition unit that can recognize a behavior of a human object included in image data captured by the video shooting unit 101. In this case, the behavior recognition unit outputs a recognition result together with information indicating the time when the recognition processing has been performed to the recognition result history storage unit 106.

If the human object identification unit 311 receives the image data of the area corresponding to the human object, the human object identification unit 311 identifies the human object included in the image data. If image data of a plurality of areas corresponding to a plurality of human objects is received, the human object identification unit 311 identifies a human object that corresponds to each image data. To this end, the human object identification unit 311 stores data indicating the feature of each identification target person.

As the presentation control apparatus 300 according to the second exemplary embodiment is applicable to a push-type information presentation terminal located in an individual house, the identification target person is, for example, a resident of the house. The feature data of the human object is, for example, facial image data, stature data, silhouette data, sexuality data, or motion feature data of each resident.

For example, if the human object identification unit 311 receives the image data of the area corresponding to the human object, the human object identification unit 311 searches for a face area included in the received image data. If the human object identification unit 311 detects a face area, the human object identification unit 311 compares the image data of the detected face area with the facial image data of each identification target person stored in the human object identification unit 311. Based on a comparison result, the human object identification unit 311 identifies a person who corresponds to the detected human object. Then, if the human object identification unit 311 succeeds in identifying a person corresponding to the detected human object, the human object identification unit 311 sets information indicating the detected person as an identification result. On the other hand, in a case where the human object identification unit 311 cannot identify any person, the human object identification unit 311 sets information indicating a non-resident person as an identification result.

In a case where the human object identification unit 311 cannot detect any face area from the image data of the area corresponding to the human object, the human object identification unit 311 retries identifying the detected human object using another method. For example, the human object identification unit 311 estimates the height of the detected human object based on information indicating the position and size of the area corresponding to the human object and compares the estimated height with the stature data of each identification target person stored in the human object identification unit 311 to identify a person who corresponds to the detected human object.

The video shooting unit 101 is a camera fixed in a space, while each person is not floating in the air and stands or lies on the ground. Therefore, the location of the detected human object with respect to the video shooting unit 101 can be roughly calculated with reference to a lower-end position included in the image data of the area corresponding to the human object. Then, if the detected human object stands upright, the height of the detected human object can be roughly calculated with reference to an upper-end position included in the image data of the area corresponding to the human object. Accordingly, the human object identification unit 311 can identify a person by estimating the height of the detected human object based on information indicating the position and size of the area corresponding to the human object and comparing the estimated height with the stature data of each identification target person stored in the human object identification unit 311.

However, the above-described method is not useful to identify a person who corresponds to the detected human object if there is a plurality of identification target persons who are identical in height, or in a case where the detected human object does not stand upright. In such a case, for example, a person who corresponds to the detected human object may be identified with reference to a silhouette shape of the detected human object or with reference to color information or a moving speed of the area corresponding to the human object. According to the present exemplary embodiment, the silhouette shape corresponds to a physical frame of each person. The color information of the area corresponding to the human object corresponds to clothes or sexuality of each person. The moving speed of the area corresponding to the human object corresponds to the action speed of each person. As described in the second exemplary embodiment, in a case where the target to be identified is a person who comes and goes in an individual house, the number of candidates to be identified as human objects is relatively small. Therefore, using the above-described feature is effective to identify each human object. If the human object identification unit 311 identifies a person who is included in the image data of the area corresponding to the human object detected by the human object detection unit 103, the human object identification unit 311 outputs a human object identification result to a degree-of-interest estimation unit 307.

The degree-of-interest estimation unit 307 estimates a degree of interest that indicates how the human object included in the image data captured by the video shooting unit 101 is interested in acquiring information while considering a situation of the human object with reference to the recognition result received from the human object recognition unit 102 and stored in the recognition result history storage unit 106. More specifically, the degree-of-interest estimation unit 307 inputs a result of the human object recognition processing performed by the human object recognition unit 102 at time "t", or a result of the human object recognition processing performed between time "t-$t_0$" and time "t" into an evaluation function set beforehand and determines an output value of the evaluation function as an estimation result of the degree of interest at time "t". In this case, the degree-of-interest estimation unit 307 switches the evaluation function (or its parameters) according to the human object identification result input from the human object identification unit 311.

For example, the degree-of-interest estimation unit 307 outputs an estimation value indicating a higher degree of interest, as degree of interest at time "t", if the distance between the position of the area corresponding to the human object and the center of the image data captured by the video shooting unit 101 is short. In this case, if a human object identification result input from the human object identification unit 311 is a human object A, the degree-of-interest estimation unit 307 uses an evaluation function that outputs a degree-of-interest "5" when the distance between the position of an area corresponding to the human object A and the center of the image data captured by the video shooting unit 101 is 100 pixels. On the other hand, if a human object identification result input from the human object identification unit 311 is a human object B, the degree-of-interest estimation unit 307 uses an evaluation function that outputs a degree-of-interest "3" when the distance between the position of an area corresponding to the human object B and the center of the image data captured by the video shooting unit 101 is 100 pixels. Thus, the degree-of-interest estimation unit 307 can generates an estimation value considering individual differences in expression of each person's degree of interest in presented information.

Further, in a case where a plurality of human objects is identified by the human object identification unit 311, the degree-of-interest estimation unit 307 switches the evaluation function for estimating a degree of interest according to the number of or the combination of the identified human objects. In a case where a plurality of human objects is identified by the human object identification unit 311, human object recognition results at time "t" corresponding to a plurality of persons are stored in the recognition result history storage unit 106. Therefore, the evaluation function to be used in such a case is a function to be input human object recognition results corresponding to a plurality of persons. For example, the evaluation function may be a function that can process each individual human object recognition result, or a function that is input a representative value (e.g., a mean value or a median value) of the human object recognition results.

As described above, the degree-of-interest estimation unit 307 estimates a degree of interest that indicates how the human object included in the image data captured by the video shooting unit 101 is interested in acquiring information considering a situation of the human object, while switching the evaluation function according to the output from the human object identification unit 311. The degree-of-interest estimation unit 307 outputs an estimation result to the information editing unit 109.

Figure 4:
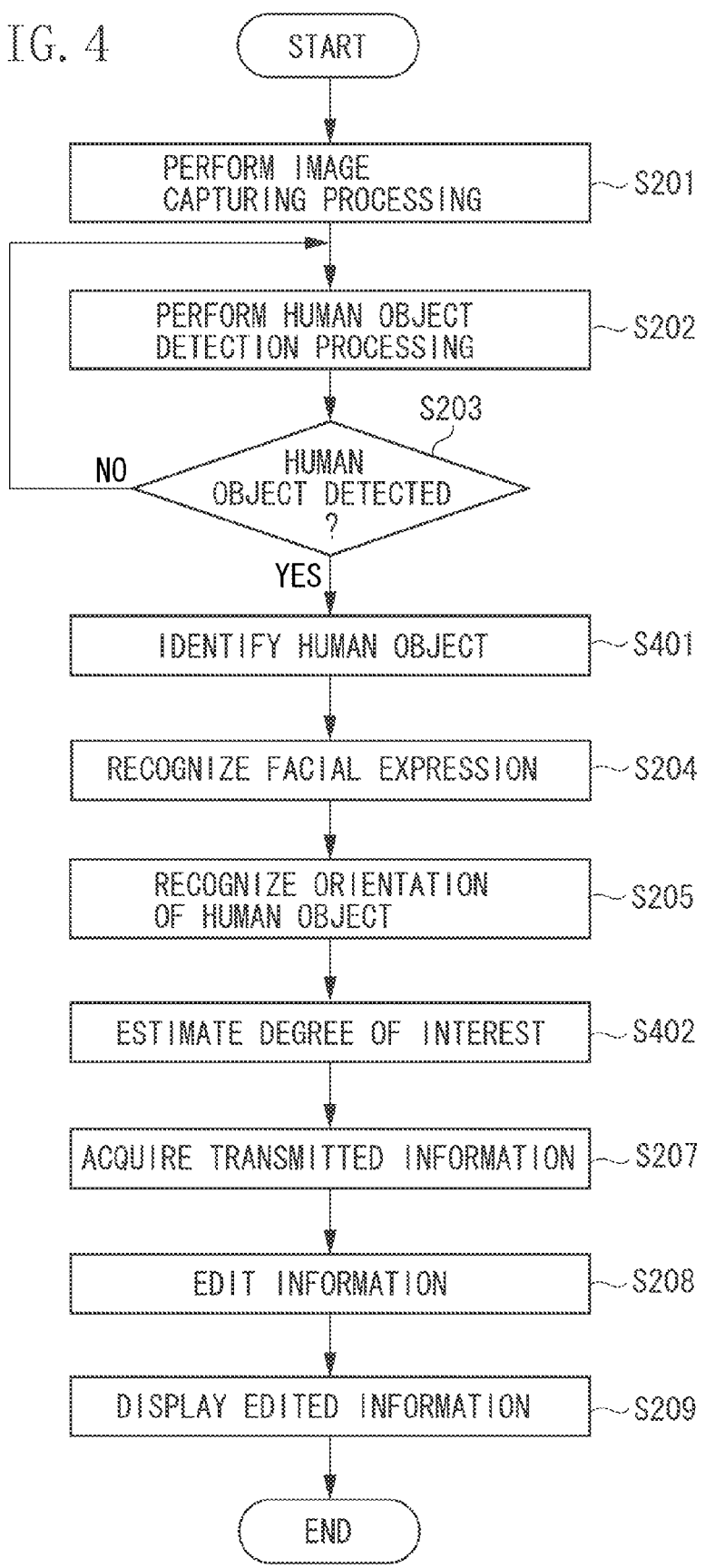
FIG. 4 is a flowchart illustrating processing to be performed by the presentation control apparatus according to the second exemplary embodiment.

Next, example processing that can be performed by the presentation control apparatus 300 according to the second exemplary embodiment is described below with reference to a flowchart illustrated in FIG. 4. In FIG. 4, processing similar to the processing performed by the presentation control apparatus 100 according to the first exemplary embodiment illustrated in FIG. 1 is denoted by the same reference numeral and the description thereof may not be repeated.

Figure 2:
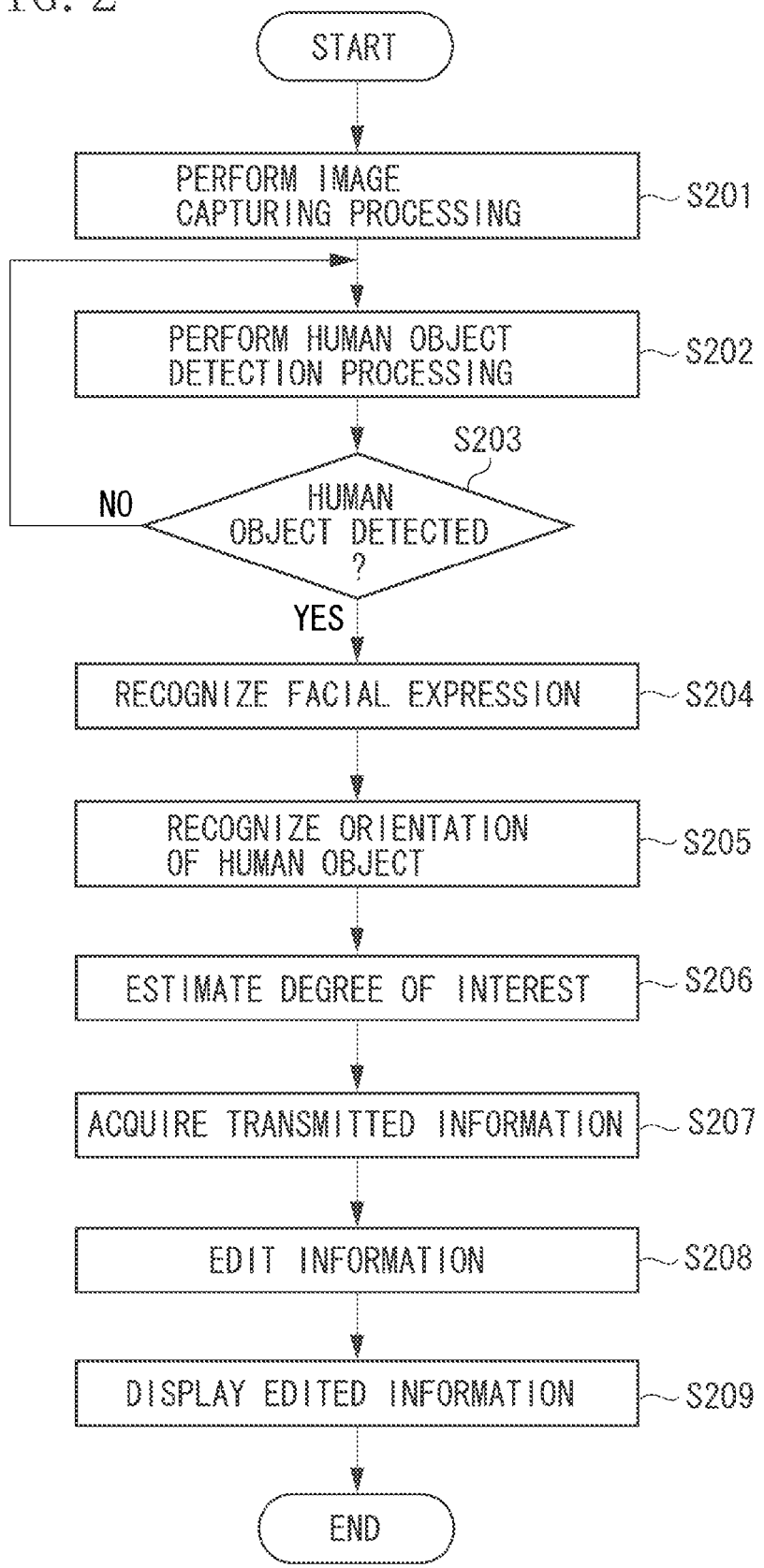
FIG. 2 is a flowchart illustrating processing to be performed by the presentation control apparatus according to the first exemplary embodiment.

Processing to be performed in step S201 is similar to the shooting processing performed in step S201 illustrated in FIG. 2. In step S202, the human object detection unit 103 detects a human object from image data captured by the video shooting unit 101. In this case, the human object detection unit 103 may detect two or more human objects from the image data captured by the video shooting unit 101. In a case where a plurality of human objects is detected from the captured image data, the human object detection unit 103 generates a detection result (i.e., the image data of the area corresponding to the human object) for all detected human objects.

In step S203, the human object detection unit 103 determines whether a human object is detected from the image data captured by the video shooting unit 101. If it is determined that a human object is detected (YES in step S203), the operation proceeds to step S401. On the other hand, if it is determined that no human object is detected (No in step S203), the operation returns to step S202.

In step S401, the human object identification unit 311 receives the image data of the area corresponding to the human object, and identifies the human object included in the received image data. If the image data pieces of the areas corresponding to a plurality of human objects are input, the human object identification unit 311 outputs a human object identification result in each image data to the degree-of-interest estimation unit 307.

In step S204, the facial expression recognition unit 104 receives the image data of the area corresponding to the human object and recognizes a facial expression of the human object included in the image data. If the image data pieces of the areas corresponding to the plurality of human objects are input, the facial expression recognition unit 104 recognizes a facial expression of the human object included in each image data. The facial expression recognition unit 104 outputs a recognition result together with information indicating the time when the recognition processing has been performed, to the recognition result history storage unit 106.

In step S205, if the orientation recognition unit 105 receives the image data of the area corresponding to the human object, the orientation recognition unit 105 recognizes an orientation of the human object included in the image data. If the image data pieces of the areas corresponding to the plurality of human objects are input, the orientation recognition unit 105 recognizes an orientation of the human object from each image data. The orientation recognition unit 105 outputs a recognition result together with information indicating the time when the recognition processing has been performed, to the recognition result history storage unit 106.

According to the present exemplary embodiment, the processing in step S205 is executed after completing the processing in step S204. The processing in step S204 may be executed after completing the processing in step S205. Alternatively, the processing in step S204 and step S205 may be simultaneously executed.

In step S402, the degree-of-interest estimation unit 307 estimates a degree of interest that indicates how the human object included in the image data captured by the video shooting unit 101 is interested in acquiring information with reference to the recognition result received from the human object recognition unit 102 and stored in the recognition result history storage unit 106. The degree-of-interest estimation unit 307 estimates a degree of interest at time "t" based on a result of the human object recognition processing performed at time "t", or based on a variation of the result of the human object recognition processing performed between time "t-t$_0$" and time "t". In this case, the degree-of-interest estimation unit 307 switches the evaluation function according to the human object identification result input from the human object identification unit 311. The degree-of-interest estimation unit 307 outputs an obtained estimation result to the information editing unit 109.

Sequential processing to be performed in the following steps S207 to S209 is similar to the corresponding processing illustrated in FIG. 2, and therefore the description thereof is not repeated.

Through the above-described processing, the presentation control apparatus 300 can present information to a person who is present in the neighborhood of a push-type information presentation terminal to which the presentation control apparatus 300 can be applied, in such a manner that the amount of information to be presented reflects a situation of the person while considering individual differences in expression of each person's degree of interest in presented information.

The presentation control apparatus according to the present exemplary embodiment is described as being applicable to a push-type information presentation terminal located in an individual house. However, the presentation control apparatus according to the present exemplary embodiment is also applied to a push-type information presentation terminal located in a public space (e.g., a shopping mall). In this case, the push-type information presentation terminal presents information to be presented to a person who comes and goes in the shopping mall, such as advertisement information relating to a shop in the shopping mall.

For example, when the presentation control apparatus 300 according to the second exemplary embodiment is applied to an information presentation terminal, if people who pass by the information presentation terminal are in such a situation that "the average moving speed of the people is high" and "the people do not squarely face the information presentation terminal", the presentation control apparatus 300 estimates that the people's degree of interest toward presented information is low and presents simple advertisement information. On the contrary, if people who pass by the information presentation terminal is in such a situation that "the average moving speed of the people is low" and "the people relatively face the information presentation terminal squarely", the presentation control apparatus 300 estimates that the person's degree of interest toward presented information is high and presents detailed advertisement information. Accordingly, the presentation control apparatus 300 according to the second exemplary embodiment can present an appropriate level of detailed advertisement to people with reference to the people's behavior.

Next, an information processing apparatus according to a third exemplary embodiment of the present invention is described below. A presentation control apparatus according to the third exemplary embodiment is applicable to a push-type information presentation terminal that can be located, for example, in a hospital or a station.

Figure 5:
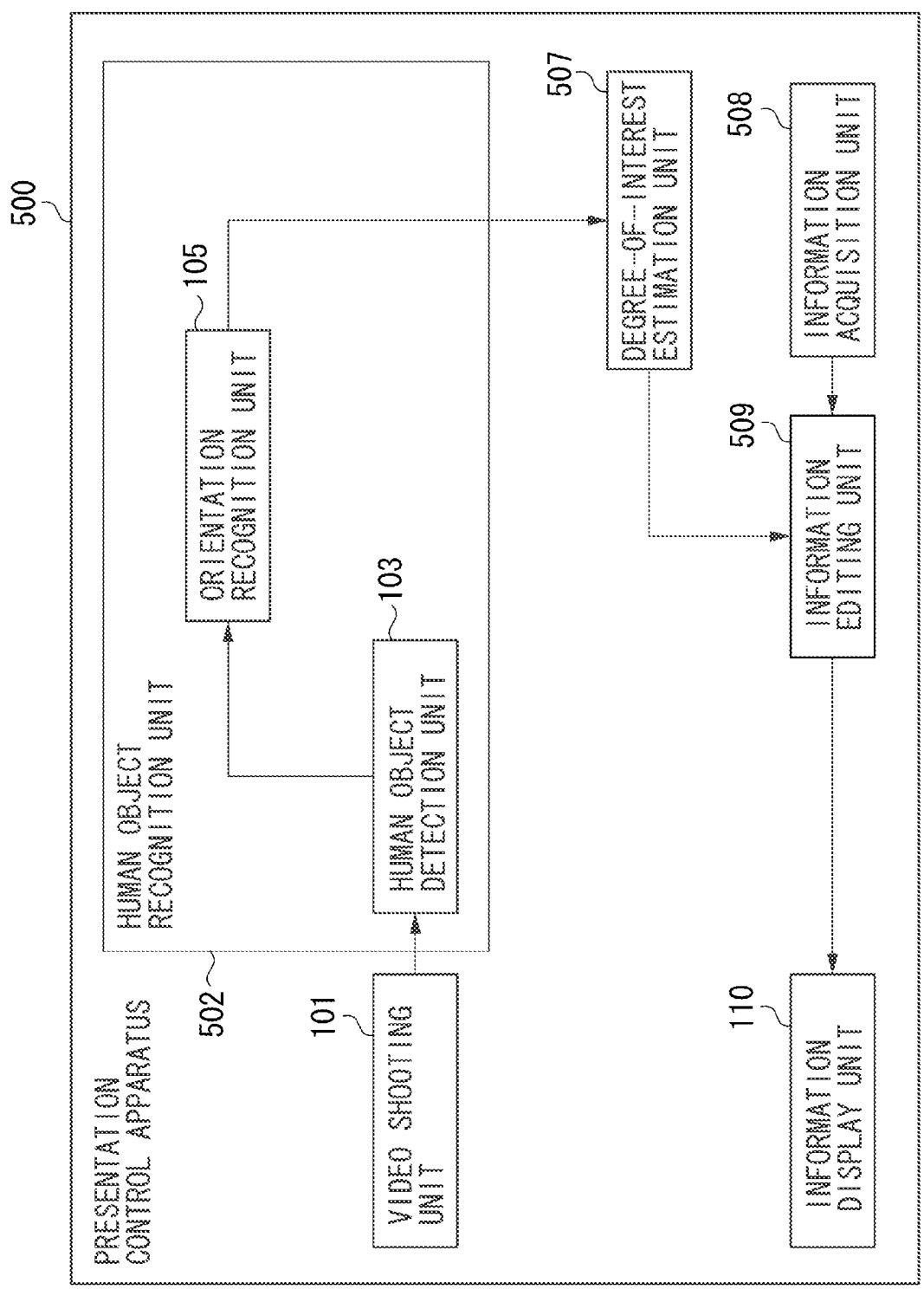
FIG. 5 illustrates an example configuration of a presentation control apparatus according to a third exemplary embodiment.

FIG. 5 illustrates an example configuration of a presentation control apparatus 500 according to the third exemplary embodiment. In FIG. 5, constituent components similar to those of the presentation control apparatus 100 described in the first exemplary embodiment with reference to FIG. 1 are denoted by the same reference numerals and the descriptions thereof may not be repeated.

The video shooting unit 101 is a camera that can capture an image of a space ahead of the presentation control apparatus 500. For example, the video shooting unit 101 can capture an image of a figure of a person who stops in front of an information presentation terminal placed in a station or a hospital. The video shooting unit 101 outputs the captured image data to the human object recognition unit 102.

A human object recognition unit 502 recognizes a human object included in the image data input by the video shooting unit 101. According to the present exemplary embodiment, the above-described processing may be performed by the human object detection unit 103 and the orientation recognition unit 105 in the human object recognition unit 502. The human object recognition unit 502 outputs a human object recognition result to a degree-of-interest estimation unit 507.

The human object detection unit 103 detects an area corresponding to the human object from the image data captured by the video shooting unit 101. For example, this detection processing may be realized in such a manner that the human object detection unit 103 detects a feature deriving from the human object (e.g., a face, a head, or a leg of the human object) from the image data input from the video shooting unit 101. If a feature deriving from a person is included in the image data captured by the video shooting unit 101, the human object detection unit 103 recognizes that "a human object is detected in a feature detected area". If any human object is detected, the human object detection unit 103 outputs image data of an area corresponding to the detected human object to the orientation recognition unit 105.

The orientation recognition unit 105 recognizes an orientation of the human object included in the image data of the area corresponding to the human object. According to the present exemplary embodiment, the term "orientation" represents the position and orientation of a head with respect to the video shooting unit 101. In this case, the orientation recognition unit 105 can use a calculation method that is similar to the calculation method described in the first exemplary embodiment. The orientation recognition unit 105 outputs a recognition result to the degree-of-interest estimation unit 507.

The degree-of-interest estimation unit 507 estimates a degree of interest that indicates how the human object is interested in acquiring information based on a line-of-sight direction of the human object indicated by the recognition result of the position and orientation of the head input from the human object recognition unit 502.

The position and orientation of the head input from the human object recognition unit 502 is the position and orientation relative to the video shooting unit 101. It is presumed that a relative position and orientation relationship between the information display unit 110 and the video shooting unit 101, which is described below, is in a fixed relationship and measurable beforehand (i.e., already known) or can be obtained by an appropriate measurement unit even if the relationship is dynamically variable.

Thus, the degree-of-interest estimation unit 507 can calculate the position and orientation of the head with respect to the information display unit 110 based on the position and orientation of the head with respect to the video shooting unit 101. The degree-of-interest estimation unit 507 calculates a point where the line-of-sight intersects the information display unit 110 while regarding the direction of the head as the line-of-sight direction. More specifically, the degree-of-interest estimation unit 507 estimates the degree of interest referring to the intersection point. In addition, the degree-of-interest estimation unit 507 expresses the estimated degree of interest at each coordinate point on a plane on which information is presented by the information display unit 110. More specifically, the degree-of-interest estimation unit 507 outputs a degree-of-interest map as an estimation result. Then, the degree-of-interest estimation unit 507 estimates that the degree-of-interest map has a maximum value of the degree of interest at the calculated intersection point and the degree of interest monotonically decreases with increasing distance concentrically from the intersection point. The degree-of-interest estimation unit 507 generates and outputs a degree-of-interest map expressing the estimation result to an information editing unit 509.

An information acquisition unit 508 acquires information transmitted from a push-type information presentation terminal to which the presentation control apparatus 500 can be applied, via a network from an external device. According to the third exemplary embodiment, for example, in a case where the above-described information presentation terminal is located in a station, the information acquisition unit 508 acquires travel information placed on a map from the information presentation terminal. Further for example, in a case where the above-described information presentation terminal is located in a hospital, the information acquisition unit 508 acquires health information relating to each body part placed on a human body diagram.

More specifically, the information acquisition unit 508 according to the third exemplary embodiment acquires a plurality of information pieces that are linked to an area of the background, such as a map or a human body diagram. In addition, the information acquisition unit 508 according to the third exemplary embodiment acquires the background on which the above-described plurality of information pieces can be placed. According to the present exemplary embodiment, a plurality of expressions that are differentiated in level of detail is included in the information linked to each area.

The information acquisition unit 508 outputs the information obtained from the external device together with the background on which the obtained information can be placed to the information editing unit 509.

The information editing unit 509 edits the information input from the information acquisition unit 508 with reference to the degree-of-interest map input from the degree-of-interest estimation unit 507. In the editing processing, the information editing unit 509 associates the background input from the information acquisition unit 508 with coordinate values on a plane on which information is presented by the information display unit 110. Thus, the degree of interest of the degree-of-interest map expressed at respective coordinate points on the plane on which information is presented by the information display unit 110 can be associated with information (including a plurality of information pieces expressed with different levels of detail) linked to an area of the background. Accordingly, a degree of interest relating to the information linked to an area of the background can be calculated. For example, a mean value of the degree of interest corresponding to an area of the background linked to the information is obtainable.

According to the present exemplary embodiment, each information may include a plurality of expressions differentiated in level of detail. The information editing unit 509 selects one expression according to the degree of interest calculated for each information. For example, if the degree of interest calculated for the information is high, the information editing unit 509 selects a detailed expression. If the degree of interest calculated for the information is low, the information editing unit 509 selects a non-detail (i.e., simple) expression. After completing the selection of the expression for the information, the information editing unit 509 lays out the information on the background information input from the information acquisition unit 508 in such a way as to clearly indicate a correspondence relationship with a location linked with the information.

Figure 6:
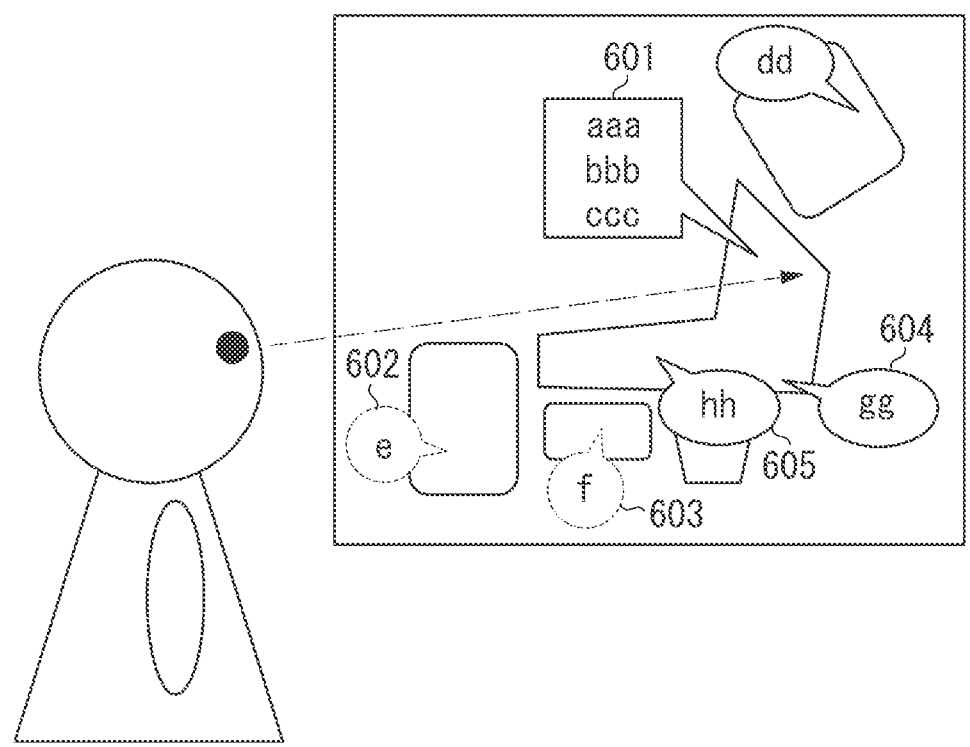
FIG. 6 illustrates an example of an editing result that can be obtained by an information editing unit.
Figure 7:
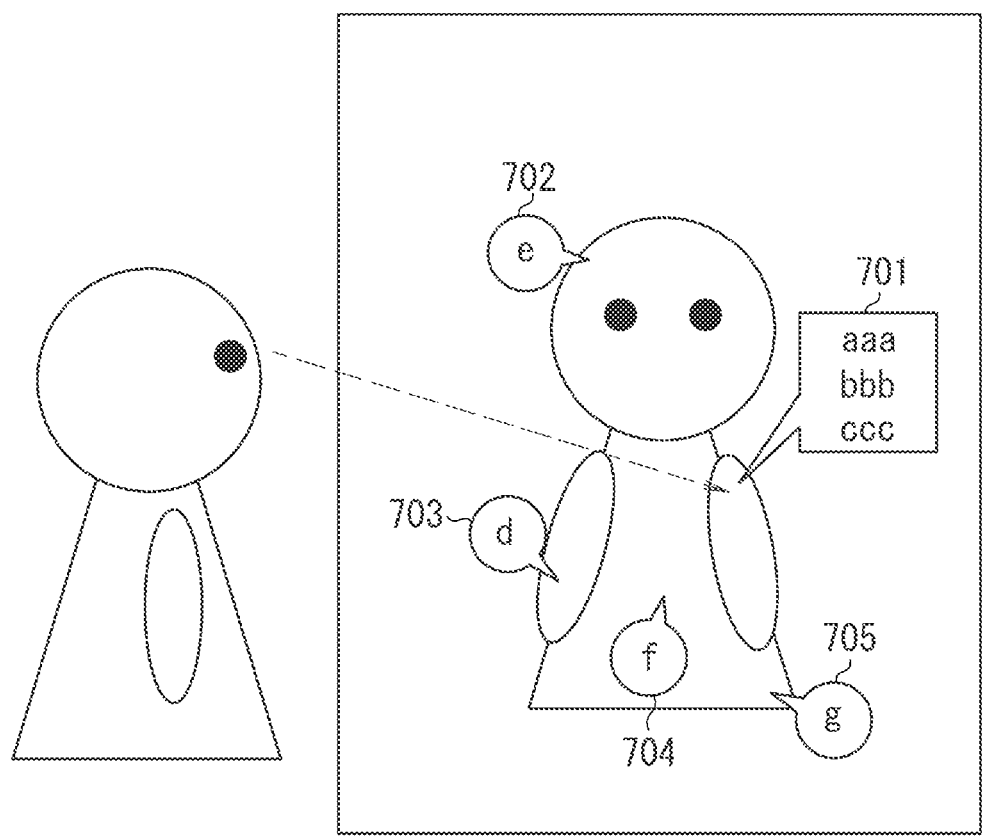
FIG. 7 illustrates an example of an editing result that can be obtained by the information editing unit.

FIG. 6 and FIG. 7 illustrate examples of results of the editing processing performed by the information editing unit 509. FIG. 6 illustrates an example of an editing result obtainable in a case where the presentation control apparatus 500 is applied to an information presentation terminal that presents travel information on a Japanese map. In FIG. 6, a line of sight of a person standing in front of the information presentation terminal is directed to the Tohoku region of Japan. In this case, the information editing unit 509 expresses detailed travel information 601 that relates to the Tohoku region and expresses simple travel information for the remaining regions. In particular, travel information 602 relating to the Kyushu region and travel information 603 relating to the Shikoku region are further simply expressed compared to travel information 604 relating to the Kanto region and travel information 605 relating to Kansai region, because the Kyushu and Shikoku regions are far from the Tohoku region and the Kanto and Kansai regions are relatively close to the Tohoku region.

FIG. 7 illustrates an example of a human body diagram, which can be obtained in a case where the presentation control apparatus 500 is applied to an information presentation terminal that presents health information. In FIG. 7, a line of sight of a person who stands in front of the information presentation terminal is directed to a shoulder of the human body. In this case, the information editing unit 509 expresses detailed health information 701 that relates to the interested shoulder and expresses simple health information 702 to 705 for other body parts.

As described above, the information editing unit 509 edits information to be presented to a person who is present in the neighborhood of the push-type information presentation terminal to which the presentation control apparatus 500 can be applied with reference to the degree-of-interest map input from the degree-of-interest estimation unit 507, and performs display layout processing for the edited information. The information editing unit 509 outputs the edited information to the information display unit 110. The information display unit 110 displays the information input from the information editing unit 509, for example, on a speaker equipped display device or a comparable projector. Accordingly, information can be presented to a person who is present in the neighborhood of the push-type information presentation terminal to which the presentation control apparatus 500 can be applied.

Through the above-described processing, the presentation control apparatus 500 according to the third exemplary embodiment can present information to a person who is present in the neighborhood of the push-type information presentation terminal in such a manner that the amount of information to be presented reflects a situation of the person while considering individual differences in expression of each person's degree of interest in presented information.

Next, example processing that can be performed by the presentation control apparatus 500 according to the third exemplary embodiment is described below with reference to a flowchart illustrated in FIG. 8. In FIG. 8, processing similar to the processing performed by the presentation control apparatus 100 according to the first exemplary embodiment illustrated in FIG. 1 is denoted by the same reference numeral and the description thereof may not be repeated.

Processing to be performed in step S201 is similar to the shooting processing performed in step S201 illustrated in FIG. 2. In step S202, the human object detection unit 103 detects a human object from image data captured by the video shooting unit 101. If any human object is detected, the human object detection unit 103 outputs image data of an area corresponding to the detected human object to the orientation recognition unit 105. Processing to be performed in step S203 is similar to the determination processing performed in step S203 illustrated in FIG. 2.

In step S205, the orientation recognition unit 105 recognizes the position and orientation of a head of the human object included in the image data of the area corresponding to the human object, and outputs a recognition result to the degree-of-interest estimation unit 507.

In step S801, the degree-of-interest estimation unit 507 estimates a degree of interest that indicates how the human object included in the image data captured by the video shooting unit 101 is interested in acquiring information, considering a situation of the human object, with reference to the recognition result received from the human object recognition unit 502. The degree of interest can be estimated based on a line-of-sight direction of the human object indicated by the recognition result with respect to the position and orientation of the head received from the human object recognition unit 502. The degree-of-interest estimation unit 507 expresses an estimation result as a degree-of-interest map that expresses the degree of interest at respective coordinates, on a plane on which information is presented by the information display unit 110. The degree-of-interest estimation unit 507 outputs the degree-of-interest map (i.e., an estimation result) to the information editing unit 509.

In step S802, the information acquisition unit 508 acquires information transmitted from the push-type information presentation terminal to which the presentation control apparatus 500 can be applied, via a network, from an external device.

According to the present exemplary embodiment, the acquired information is travel information placed on a map or health information relating to each body part placed on a human body diagram. The information acquisition unit 508 outputs the information acquired from the external device to the information editing unit 509.

In step S803, the information editing unit 509 edits the information input from the information acquisition unit 508 with reference to the degree-of-interest map input from the degree-of-interest estimation unit 507. In the above-described editing processing, the information editing unit 509 expresses detailed information linked to an area where a higher degree of interest is indicated on the degree-of-interest map input from the degree-of-interest estimation unit 507 and simply expresses information linked to an area where a lower degree of interest is indicated on the degree-of-interest map. The information editing unit 509 determines a display layout for the edited information. The information editing unit 509 outputs the edited and laid out information to the information display unit 110. Processing to be performed in step S209 is similar to the processing performed in step S209 illustrated in FIG. 2.

Through the above-described processing, the presentation control apparatus 500 according to the third exemplary embodiment can present information to a person who is present in the neighborhood of a push-type information presentation terminal to which the presentation control apparatus 500 can be applied, in such a manner that the amount of information to be presented reflects a situation of the person while considering individual differences in expression of each person's degree of interest in presented information. In particular, the presentation control apparatus 500 according to the third exemplary embodiment can edit the level of detail of information to be presented to a person who is present in the neighborhood of the information presentation terminal according to the person's degree of interest in acquiring information in each area, which can be estimated based on a line of sight of the person in each area.

According to the above-described exemplary embodiments, the presentation control apparatus controls an amount of information to be displayed considering how a situation of a person in the neighborhood of an information presentation terminal shows an interest in information acquisition. For example, if a person can stay long in the neighborhood of the information presentation terminal, it can be regarded that the person is deeply interested in acquiring information. Thus, the presentation control apparatus controls the amount of information to be displayed by reflecting such a situation. Further, for example, if a person's orientation indicates that his/her line of sight is directed to the information presentation terminal, it can be regarded that the person is deeply interested in acquiring information. Thus, the presentation control apparatus controls the amount of information to be displayed by reflecting such a situation. Furthermore, for example, if a behavior of a person in the neighborhood of the information presentation terminal is not relevant to the information acquisition, it can be regarded that the person is not so interested in information acquisition. Thus, the presentation control apparatus controls the amount of information to be displayed by reflecting such a situation.

More specifically, the presentation control apparatus according to the above-described exemplary embodiments determines a level of detail of information to be presented to a person in the neighborhood of the information presentation terminal based on an estimation value of the person's degree of interest as to "acquiring information". Therefore, even if a neighboring person is not so interested in "acquiring information" the push-type information presentation terminal can simply present a reduced amount of information according to the situation and can increase the possibility that the neighboring person notice the presented information. On the contrary, in a case where a person in the neighborhood of the push-type information presentation terminal is deeply interested in "acquiring information", the information presentation terminal can present an increased amount of detailed information according to the situation to satisfy the person's desire for information.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-262533 filed Nov. 30, 2011, which is hereby incorporated by reference herein in its entirety.

What is claimed is:

1. An information processing apparatus comprising:
a memory; and
a processor in communication with the memory, the processor configured to provide:
a recognition unit configured to recognize a human object included in a captured image data;
an identification unit configured to identify the human object included in the image data;
an estimation unit configured to estimate a degree of interest of the human object in acquiring information, based on a recognition result obtained by the recognition unit, and switching to a different method, by changing an evaluation function, for estimating the degree of interest of the human object in acquiring information, based on the human object identified by the identification unit;
an acquisition unit configured to acquire information as a target to be presented to the human object;
a generation unit configured to generate information to be presented to the human object from the information acquired by the acquisition unit, based on the degree of interest estimated by the estimation unit; and
a control unit configured to cause an output unit to output the information generated by the generation unit.

2. The information processing apparatus according to claim 1, wherein the recognition unit is configured to recognize an orientation of the human object included in the image data.

3. The information processing apparatus according to claim 1, wherein the recognition unit is configured to recognize a facial expression of the human object included in the image data.

4. The information processing apparatus according to claim 1, wherein the recognition unit is configured to recognize at least one of a size of a pupil and a size of an eye of the human object included in the image data.

5. The information processing apparatus according to claim 4, wherein the estimation unit is configured to measure a change in the size of the pupil or the number of blinks of the human object based on at least one of the size of the pupil and the size of the eye of the human object which is recognized by the recognition unit, and estimates the degree of interest of the human object in acquiring information based on a measurement result.

6. The information processing apparatus according to claim 1, wherein the acquisition unit is configured to set a priority level for each information as a target to be presented to the human object, and the generation unit is configured to generate information to be presented to the human object based on the priority level set for each information and the degree of interest estimated by the estimation unit.

7. The information processing apparatus according to claim 6, wherein the generation unit is configured to generate information including more information pieces as the degree of interest estimated by the estimation unit is higher.

8. The information processing apparatus according to claim 1, wherein the estimation unit is configured to switch the method for estimating the degree of interest of the human object in acquiring information based on the number of human objects included in the image data recognized by the recognition unit.

9. The information processing apparatus according to claim 1, wherein the estimation unit is configured to switch the method for estimating the degree of interest of the human object in acquiring information, based on estimation timing of the degree of interest of the human object in acquiring information.

10. The information processing apparatus according to claim 1, wherein the estimation unit is configured to estimate a degree of interest at a particular time based on a history of a recognition result up to the particular time obtained by the recognition unit.

11. The information processing apparatus according to claim 1, wherein the recognition unit is configured to recognize a line of sight of the human object included in the image data, and the estimation unit is configured to estimate the degree of interest of the human object in acquiring information based on at least one of a location, frequency, and time in a situation that the line of sight of the human object is directed to the output unit.

12. The information processing apparatus according to claim 11, wherein the estimation unit is configured to estimate the degree of interest of the human object in acquiring information for each area based on at least one of frequency and time in a situation that the line of sight of the human object is directed to the output unit, and the selection unit is configured to select information to be presented to the human object for the each area based on the degree of interest estimated by the estimation unit.

13. A method for information processing performed by an information processing apparatus, the method comprising:
recognizing a human object included in a captured image data;
identifying the human object included in the image data;
estimating a degree of interest of the human object in acquiring information based on an obtained recognition result, and switching to a different method, by changing an evaluation function, for estimating the degree of interest of the human object in acquiring information, based on the identified human object;
acquiring information as target to be presented to the human object;

generating information to be presented to the human object from the acquired information based on the estimated degree of interest; and causing an output unit to output the generated information.

14. A non-transitory computer readable storage medium storing a program that causes a computer to execute processing comprising:

recognizing a human object included in a captured image data;

identifying the human object included in the image data;

estimating a degree of interest of the human object in acquiring information based on an obtained recognition result, and switching to a different method, by changing an evaluation function, for estimating the degree of interest of the human object in acquiring information, based on the identified human object;

acquiring information as target to be presented to the human object;

generating information to be presented to the human object from the acquired information based on the estimated degree of interest; and causing an output unit to output the generated information.

\* \* \* \* \*